Oct. 26, 1965  W. T. CLARK, JR  3,213,962
AIRCRAFT DOOR MECHANISM
Filed June 1, 1964   3 Sheets-Sheet 1

INVENTOR
WALTER T. CLARK, JR.

BY *Philpott, Steininger & Priddy*
ATTORNEYS

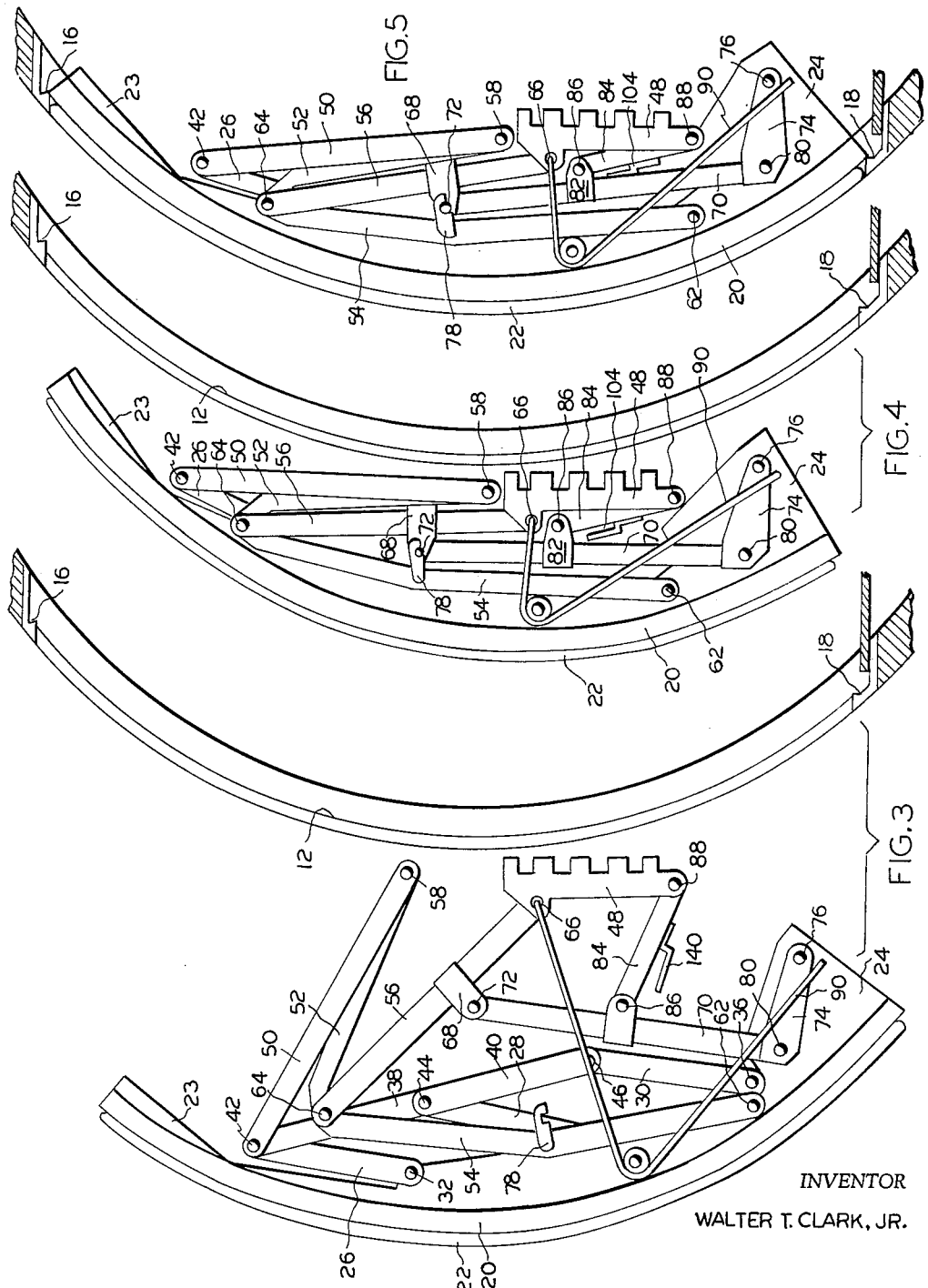

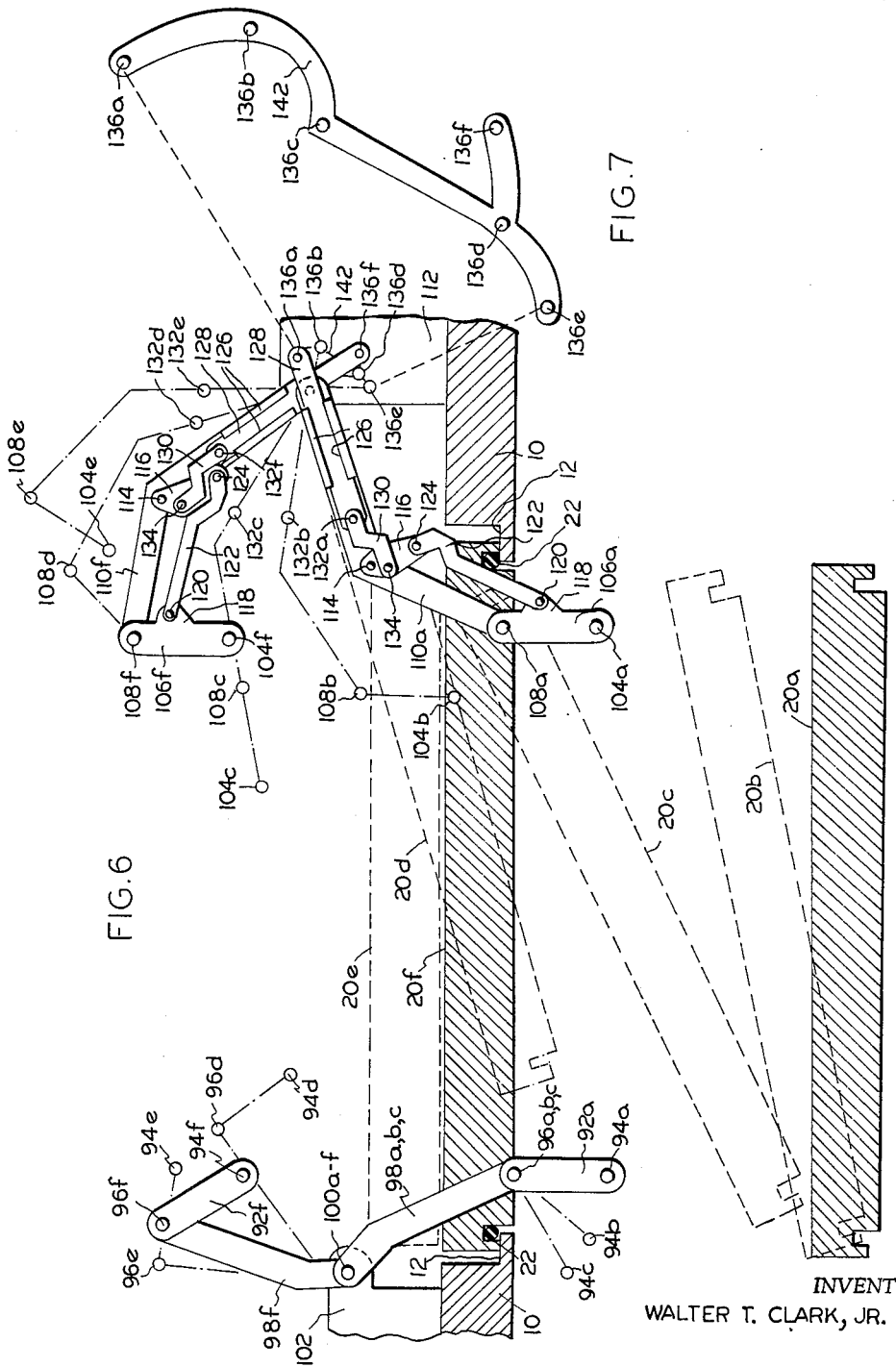

3,213,962
AIRCRAFT DOOR MECHANISM
Walter T. Clark, Jr., 6441 Happy Lane, Dallas, Tex.
Filed June 1, 1964, Ser. No. 371,698
15 Claims. (Cl. 182—78)

The present invention relates to a mechanism for opening and closing aircraft doors. In a more specific aspect, the present invention relates to plug-type doors for pressurized aircraft cabins and a mechanism for opening such doors. A still more specific aspect of the present invention is the provision of an outwardly opening, plug-type aircraft door which plugs into its opening from the interior of the cabin and carries access steps to the aircraft cabin.

A large number of present-day aircraft have their cabins mechanically pressurized when the aircraft is flying at substantial altitudes. This pressurization, among other things, improves the comfort of the passengers. At high altitudes the pressure is maintained considerably above the atmospheric pressure outside the cabin, and sometimes is as high as ten tons or more bearing on the face of the aircraft door. This extreme pressure makes it most difficult to design aircraft doors and their opening mechanisms so that they will open only when the aircraft is on the ground. Obviously, if the door is constructed conventionally to close against a jamb from the exterior of the aircraft, such a door can be inadvertently unlatched and the high pressure within the aircraft cabin has often forced the door open and, in some cases, has pushed passengers out the open door. The same problem exists even though the latch mechanism holding the door closed is not accidentally tripped, since the tremendous pressures within the cabin can push the door open by breaking or overcoming the resistance of a worn latch mechanism. Thus, it is quite obvious that doors for pressurized aircraft cannot be made to close from the exterior and still possess a reasonable degree of safety.

As a result of the above, most aircraft, which have pressurized cabins, have been constructed with doors larger than the cabin opening at least partway around their periphery, and plugged into the opening from the inside of the cabin. Thus the door will be held in its closed position by the cabin pressure and eliminate the possibility of the doors being forced open when in flight. This construction, however, creates additional problems since such a door would normally be swung inwardly to open it; and the limited space within the aircraft cabin makes it inadvisable to swing the door in or to pull it in partway and then slide it sidewardly. As a result, there have been a number of proposals for the construction of interiorly-plugged aircraft doors and mechanisms for opening such doors outwardly.

For example, in Patent 2,751,636 to Heineman et al., the door is constructed so that it is larger than the opening at its sides and thus plugs from the inside against the side jambs and fits between the sill and lintel at the bottom and top. This structure therefore solves a part of the problem in that the door will partially plug from the inside. Such a structure also permits the use of a fairly simple opening mechanism, since, in order to open the door to the outside, it merely needs to be rotated without outward movement a sufficient amount to permit the sides of the door to clear the side jambs and then swing outwardly. This structure, however, has the obvious problem that it is difficult to provide an appropriate seal at the top and bottom of the door which will withstand the extreme pressures built up within the cabin.

Still another approach to the problem of opening an inside plugging door to the outside is suggested in Patent 3,051,280 to Bergman et al. In accordance with the Bergman patent, the door is larger than the cabin opening at its sides and thus plugs from the same manner as the Heineman et al. door. However, rather than having the top and bottom substantially flush with the sill and lintel, as does Heineman et al., Bergman et al. provide retractable top and bottom sections which plug from the inside but can be retracted to make the vertical dimensions of the door smaller than the cabin opening. This contraction of the top and bottom sections thus permits the door to be rotated partway to clear the side jambs and then swing outwardly to the outside of the cabin. The Bergman et al. structure obviously requires additional complex mechanisms for extending and retracting the bottom and top sections and, therefore, does not provide a complete answer to the problem associated with the plug-type doors. Obviously, the Bergman et al. door structure will also have certain disadvantages so far as sealing is concerned, particularly where the folds in the door are made.

Patent 3,085,297 to Linderfelt also provides an inside plugging door structure which is also designed to solve the problem of opening the door to the outside. The primary solution provided by Linderfelt is very much similar to that provided by Bergman et al., since the door is constructed to plug against the side jambs and has top and bottom sections which are extensible to plug and form a tight seal at the top and bottom. However, as in Bergman et al., when the folding top and bottom sections are retracted, the vertical dimension of the door is smaller than the vertical dimension of the opening and the door may be opened to the outside simply by partially rotating the door to clear the side jambs and then swinging the door to the outside. As an alternative to the retractable top and bottom sections, or the foldable type door, Linderfelt also suggests that a plug-type door larger than the aircraft cabin opening both at the top and bottom and at the sides can be opened to the outside by constructing the door opening and the door panel as matching rhomboids, rather than in their usual rectangular form. This construction of the door opening and the door as a parallelogram, together with the curved structure of the cabin and the door, permits the door to be rotated slightly to clear the side jambs and then swung outwardly in much the same manner as is done with those doors having foldable top and bottom sections while at the same time moving the door vertically to clear the lintel or jamb as the case may be. While this latter construction does improve the situation so far as the seals are concerned, and permit one to actually open a door larger than the cabin opening outwardly through the opening, it of course, requires considerable alteration of the normal door opening structure and is therefore limited in its use in this respect. This door obviously must be used in new aircraft construction and cannot be utilized in refurbishing existing aircraft, the vast majority of which have rectangular door openings. It is also obvious that the trapezoidal shape of the door opening, even though only a slight variation from the rectangular opening, will have a tendency to reduce the structural strength of the cabin in the vicinity of the door. Thus conventional bracing and construction cannot be employed but additional bracing will be required. Finally, the several complex mechanisms needed to carry out the basic movements of the door will necessarily be prone to breakdown or wear.

It is thus quite obvious from the above discussion of the prior art that none of the prior art workers have provided a door structure and opening mechanism in which a plug-type door larger than the cabin opening can be passed through the opening to the outside of the cabin, while yet maintaining the substantially rectangular structure of the cabin opening and the advantages of sealing the door from the inside of the cabin.

It is therefore an object of the present invention to provide an improved aircraft door structure and opening mechanism.

A further object of the present invention is to provide a door opening mechanism adapted to open an interiorly-plugged aircraft door to the outside of the cabin.

Another object of the present invention is to provide a plug-type aircraft door which is substantially rectangular and larger than the cabin opening and mechanism form opening such door from an inwardly-plugged position to a position outward of the cabin.

A still further object of the present invention is to provide an improved inwardly-plugged aircraft door and mechanism for opening such door to the outside of the cabin and unfolding built-in steps constructed on the interior of the door.

Another and further object of the present invention is to provide a mechanism for opening an interiorly-plugged aircraft door to the outside of the cabin; including, means for tilting the door to a smaller vertical dimension than the door opening and, cooperating therewith, a means for guiding the door outwardly at an angle such that the side jambs of the cabin opening will be cleared.

Yet another object of the present invention is to provide an improved mechanism for opening an inwardly-plugged aircraft door in which the door is moved from a position inside the cabin substantially parallel to the interior surface of the cabin, outwardly with one corner leading the remaining corners through the opening and thereafter each of the remaining corners following the first until all corners are cleared, whereupon the door is righted to a position substantially parallel to the exterior surface of the cabin.

These and other objects of the present invention will be apparent from the following detailed description when read in conjunction with the drawings, wherein:

FIGURE 3 is a side view of the door folded to an upright position and just prior to beginning its movement toward the interior of the cabin;

FIGURE 4 is the next step of closing the door in which the door is tilted to a lower vertical silhouette and is just ready to enter the cabin opening;

FIGURE 5 shows the door completely closed from the interior of the cabin;

FIGURE 6 is a plan view, partially in section, of the aircraft door and the door hinge mechanism for guiding the door through the opening and thence to a plugging position inside the opening; and FIGURE 7 is an enlarged view of the cam track shown in FIGURE 6 and which guides the cam mechanism of the door closure.

Figure 2:
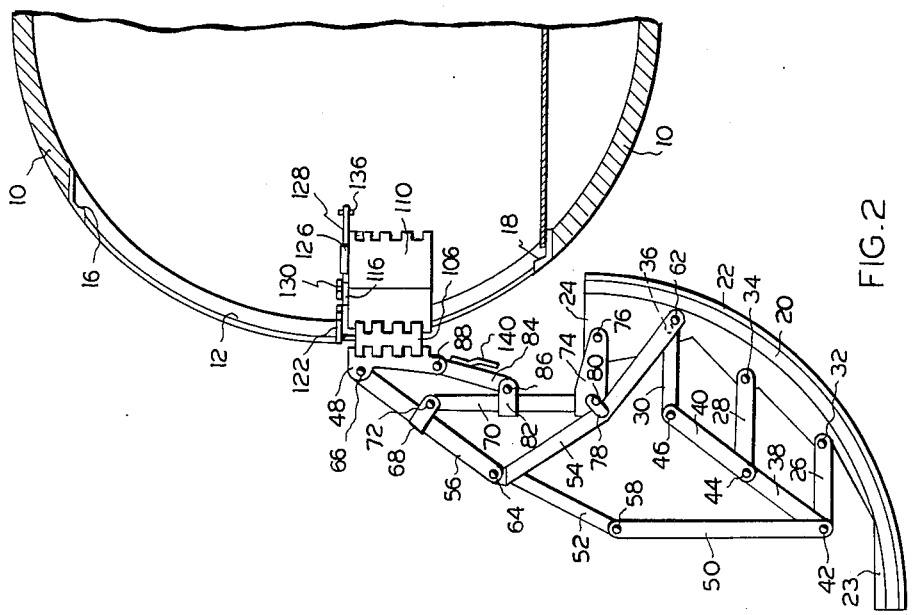
FIGURE 2 is a side elevation of the door in the completely extended position of FIGURE 1.
Figure 1:
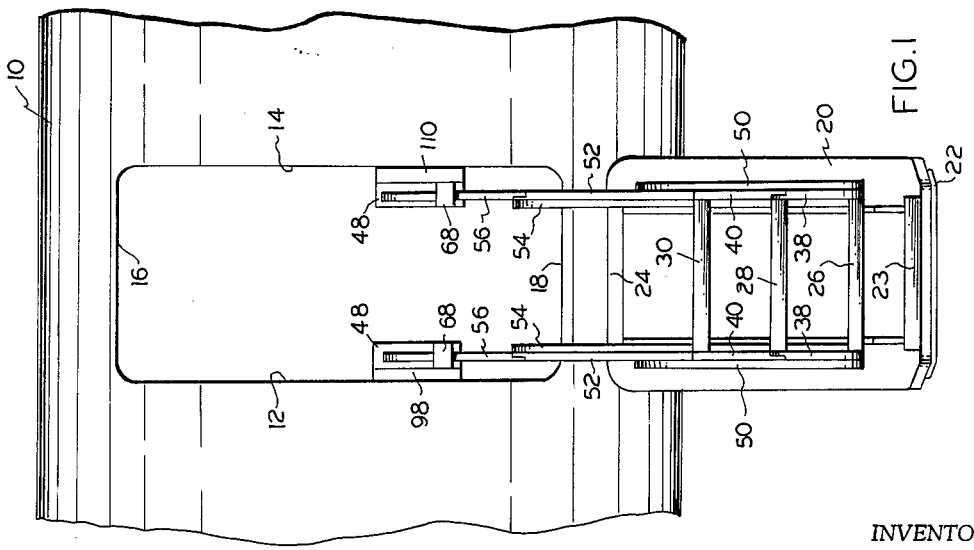
FIGURE 1 is a front elevation of the door of the present invention, with its steps folded downwardly for entrance and exit of passengers to and from the cabin.

Referring now to FIGURES 1 and 2 of the drawings, the numeral 10 refers to a section of the side of an aircraft which is generally curved outwardly as shown. Formed in the side of the cabin structure 10 is an opening having side jambs 12 and 14, lintel 16 and sill 18. It is to be noted, as previously indicated, that the opening formed in the side of the aircraft is substantially rectangular in form, having side jambs 12 and 14 parallel to one another and lintel 16 and sill 18 parallel to one another. Having substantially the same rectangular shape but slightly larger in both its vertical and horizontal dimensions is door member 20, which is adapted to plug into the opening in the side of the aircraft from the interior thereof. Thus, as can be seen, door 20 is larger than the opening on all four sides and is provided around its edge with a resilient seal element 22, which seals against jambs 12 and 14, lintel 16 and sill 18 from the interior of the aircraft, thus providing an airtight seal when the door is closed. Mounted on or formed integrally with door 20 are steps 23 and 24, and 26, 28 and 30, respectively. Steps 26, 28 and 30 are appropriately pivoted to door 20 through pivot elements 32, 34 and 36. Steps 26, 28 and 30 are joined and supported at their forward edges by braces 38 and 40. Brace 38 is joined to step 26 through pivot element 42 and to step 28 through pivot element 44. Brace 40 is connected to step 28 through pivot element 44 and step 30 through pivot element 46. Door 20 is connected to vertically-disposed hinge member 48 through a railing made up of foldable railing elements 50 and 52 and 54 and 56, respectively. Rail element 50 is pivotally attached to step 26 through pivot element 42 and is pivotally connected to rail element 52 through pivot element 53. The upper end of rail element 52 is connected to the upper end of rail element 54 and at the lower end of rail element 56 through pivot element 64. Rail element 54 is connected at its lower end to door member 20 through pivot 62. Rail element 56 is connected at its upper end to hinge member 48 through pivot element 66. Mounted centrally about rail element 56 is fixed sleeve 68. Link member 70 is pivotally connected to sleeve 68 through pivot element 72. The lower end of link 70 is rigidly connected to stop element 74 which rests against rail element 54 when the stair mechanism is in its downwardly extended position. Stop element 74 is, in turn, pivotally connected to step 24 through pivot element 76. Mounted pivotally near the center of rail element 54 is latch 78. Latch 78 is adapted to cooperate with and latch over protruding stud element 80, which is mounted on stop member 74. Surrounding and mounted on link 70 near its center is sleeve member 82. Pivotally connecting sleeve 82 to hinge member 48 and sleeve 82 is link 84, which is attached through pivot elements 86 and 88, respectively. A motor means (not shown) is mounted within and under step 24 and connected to this motor is wire pulley 90. The motor winds wire 90 to fold the stair and railing mechanism and swing door 20 upwardly to the position shown in FIGURE 3.

It is to be noted that all of the elements previously mentioned in connection with FIGURES 1 and 2 are mirror images of one another on either side of the door. Accordingly, like numbers have been used to designate complementary ones of different elements. However, from complementary hinge members 48 the mechanisms on either side of the door differ slightly and different numbers will therefore be utilized in describing these elements.

Pivotally connected to hinge member 48 on the left-hand side of the door is vertical hinge member 92. Pivot element 94 connects these two hinge members. Connected to the other end of hinge member 92 through pivot element 96 is dog leg hinge member 98. Dog leg hinge member 98 extends into and around left jamb 12 of the door opening and is pivotally attached through pivot element 100 to mounting block 102. Mounting block 102 is fixedly attached to the inside frame of aircraft body 10.

Connected to right-hand hinge member 48 through pivot element 104 is straight hinge member 106. Connected to hinge member 106 through pivot 108 is dog leg hinge member 110, which is shaped to extend around and into the interior of the cabin. Dog leg hinge member 110 is, in turn, pivotally mounted on mounting block 112. Mounting block 112 is fixedly attached to the interior surface of the aircraft body 10. Mounted on dog leg hinge 110 at the apex of its angle through pivot element 114 is tab element 116. Formed on and protruding from hinge member 106 is extension 118 to which is pivotally connected link member 122. Link member 122 is pivoted on extension 118 through pivot element 120. Link member 122 is pivotally connected to tab element 116 and is adapted to maintain tab 116 and extension 118 the same distance apart irrespective of the positions of the two elements with regard to the other elements. This is accomplished by pivotally connecting link 122 to tab 116 through pivot element 124.

Mounted in channels 126 on the innermost end of dog leg hinge 110 is slideable follower element 128. Follower element 128 is pivotally connected to link 130 through pivot element 132 and link 130 is connected at its other end to tab 116 through pivot element 134. Mounted in the free end of follower 128 is cam pin 136.

Referring briefly to FIGURES 3 through 5, it can be seen that FIGURE 3 shows the door 20 after it has been tilted upwardly and the steps and stair railing have been substantially completely folded into the door. In this position the door is ready to begin its movement toward the door opening. As the movement of the door progresses toward the right and the railing folds still further, it will be noted in FIGURE 4 that door 20 is tilted slightly with respect to the opening in aircraft side section 10, thereby presenting a smaller vertical silhouette than the door opening. This is accomplished in accordance with the present invention by providing compressible door tilting means 140 between link 84, or another appropriate element adjacent hinge member 48, which bears against link 70, or some other appropriate member. In other words, compressible member 140 may be a leaf spring as shown or a dash pot or hydraulic mechanism adapted to bias the bottom of the door outwardly until the door has entered the cabin and which may then be overcome by sufficient force to right the door to a position substantially parallel to the wall of the aircraft and plug the door against lintel 16 and sill 18, as shown in FIGURE 5 of the drawings. The exact location of tilting means 140 is not critical so long as it is located below the nominal center of rotation of door 20 on hinge member 48, that is, below pivot element 66. Latch element 78 latches over an extension of pivot element 72 to hold the railing and steps in their folded position, as shown in FIGURES 4 and 5.

The action of the hinge mechanisms attached to hinge member 48 is best shown in FIGURES 6 and 7. FIGURE 6 and in particular FIGURE 7 shows cam track 142 which is attached to mounting block 112. For clarity of illustration, cam track 142 is shown without a corresponding top. It should be understood, however, that cam track 142 is preferably formed in two complementary surfaces and follower pin 136 rides in both tracks. FIGURE 6 shows the movement of the hinge mechanisms as the door is moved from a position outside the cabin, as in FIGURE 4, to a position where it is plugged against the side jambs and the lintel and still of the opening, as shown in FIGURE 5. The hinge mechanisms are shown in full in their extended position A and in their closed position F, which, as previously indicated, correspond to the positions of the door when viewed from the side, as in FIGURES 4 and 5. Alphabetical designations to indicate corresponding points in the positions of the door 20 and the basic hinge elements and positions on cam track 142 of FIGURE 7 have been used. The remaining four basic positions of the hinge mechanisms between positions A and F are shown only as single lines for purposes of clarity. It is, however, obvious how follower 128 follows along cam track 142 to guide door 20 from position A outside the cabin to position E inside the cabin and then to a plugging position F. In this connection, it is also quite obvious that door 20 enters the opening in cabin structure 10 by first passing the upper right-hand corner of door 20 through the opening followed by the lower right-hand corner; then the upper left-hand corner, and, finally, the lower left-hand corner. Thus, by following this entry sequence, the cooperative tilting means and cam means are effective in passing a door larger than the rectangular opening through the opening to the interior of the cabin and then plugging the door into the opening from the interior of the cabin. It is obvious that this accomplished in accordance with the present invention by comparatively simple mechanism and further, that the mechanisms utilized permit one to add foldable steps for ingress to or egress from the cabin to the door itself. It is also quite obvious that various modifications of the basic invention can be made without departing from the invention. In order to simplify and clarify the illustrations, various links have been shown as substantially flat pieces of metal. However, it is quite obvious to one skilled in the art that any or all of these elements may be and usually are made of tubular stock. In particular, follower 128 and channels 126 can be appropriate telescoping tubes. Likewise, pivot elements such as 58 may be conveniently pivoted tubular members of known construction. It is also obvious from the prior description that by reversing the elements which rotate the door to its downwardly extended position the door can be rotated into an upward position and thus utilized on aircraft which require movable stairs for boarding and alighting. When utilized to open the door upwardly, the same basic tilting means and cam means would be utilized.

Having described my invention, it is to be understood that the modifications specifically mentioned, as well as other variations and modifications obvious to one skilled in the art, are meant to be included, and that the present invention is to be limited only in accordance with the appended claims.

I claim:

1. In an aircraft wall structure having a substantially rectangular opening therein and a door of the same shape but larger in both its vertical and horizontal dimensions than said opening and adapted to seat against complimentary edges of said opening from the interior of the aircraft, the combination therewith of a mechanism for opening and closing said door comprising:

(a) foldable step means pivotally connected to the interior of said door, (b) foldable hand rail means on each side of said door connected at one end to said door and said step means to fold said step means with said rail means, (c) motive means adapted to fold said rail and step means, (d) a first pair of vertically-disposed hinge means having their upper ends pivotally connected by a horizontal pivot to the free end of said rail means, (e) link means pivotally connected to said door at one end and to the bottom of said first hinge means at the other end and adapted to restrict the pivoting of said door to a predetermined arcuate path, (f) compressible biasing means mounted on said link means at a point below the top of said first hinge means and adapted to normally bias the bottom of said door outwardly when said door is pivoted to a position generally opposite said opening and such that said door presents a smaller vertical silhouette than the vertical height of said opening, (g) a second pair of vertically-disposed hinge means having one end pivotally connected by a vertical pivot to said first hinge means, (h) a third pair of vertically-disposed hinge means having one end pivotally connected by a vertical pivot to the other end of said second hinge means and having a bend therein to curve around said edges of said opening and clear said edges in all operating positions, (i) said third hinges having their other ends pivotally connected by a vertical pivot to a stationary mounting on the interior of said wall structure, (j) cam means mounted on the interior of said wall structure adjacent one of the hinge units, (k) a cam follower slideably mounted parallel to that end of said third hinge means connected to the stationary pivot point and having one end operatively connected to said cam and adapted to follow said cam means, and (l) connecting means pivotally conecting the other end of said follower to said second hinge means, (m) said cam means, through said follower and hinge unit, being adapted to follow the sequence of operations which turns said door on vertical axes until it presents a horizontal silhouette smaller than the width of said opening, pulls said door inwardly through said opening to a position offset inwardly from said opening and pushes said door outwardly into sealing engagement with the periphery of said opening.

2. A mechanism in accordance with claim 1 wherein the biasing means is a spring.

3. A mechanism in accordance with claim 1 wherein the connecting means includes a first link having one end pivotally connected to the third hinge at the apex of its bend a second link pivotally connected to the free end of said first link and pivotally connected to the second hinge, and a third link pivotally connected to the follower and to said first link.

4. In an aircraft wall structure having an opening therein and a door larger in both its vertical and horizontal dimensions than said opening and adapted to seat against complimentary edges of said opening from the interior of the aircraft, the combination therewith of a mechanism for opening and closing said door comprising:
(a) a first pair of vertically-disposed hinge means pivotally connected by a horizontal pivot to one end of said door,
(b) compressible biasing means mounted between said first hinge means and the other end of said door and adapted to normally bias said other end of said door outwardly when said door is pivoted to a position generally opposite said opening and such that said door presents a smaller vertical silhouette than the vertical height of said opening,
(c) a second pair of vertically-disposed hinge means having one end pivotally connected by a vertical pivot to said first hinge means,
(d) a third pair of vertically-disposed hinge means having one end pivotally connected by a vertical pivot to the other end of said second hinge means and having a bend therein to curve around said edges of said opening and clear said edges in all operating positions,
(e) said third hinges having their other ends pivotally connected by a vertical pivot to a stationary mounting on the interior of said wall structure,
(f) cam means mounted on the interior of said wall structure adjacent one of the hinge units, a cam follower slideably mounted parallel to that end of said third hinge means connected to the stationary pivot point and having one end operatively connected to said cam means and adapted to follow said cam means, and
(g) connecting means pivotally connecting the other end of said follower to said second hinge means,
(h) said cam means, through said follower and hinge unit, being adapted to follow the sequence of operations which turns said door on vertical axes until it presents a horizontal silhouette smaller than the width of said opening, pulls said door inwardly through said opening to a position offset inwardly from said opening and pushes said door outwardly into sealing engagement with the periphery of said opening.

5. In an aircraft wall structure having an opening therein and a door larger in both its vertical and horizontal dimensions than said opening and adapted to seal against complimentary edges of said opening from the interior of the aircraft, the combination therewith of a mechanism for opening and closing said door comprising:
(a) hinge means attached to either side of said door and to stationary supports on the interior of said wall adjacent the edges of said opening,
(b) compressible biasing means mounted between said hinge means and said door and normally biasing one end of said door at an angle with respect to said opening such that said door presents a smaller vertical silhouette than the vertical height of said opening, and
(c) cam means including a cam track mounted in the interior of said aircraft adjacent one of said hinge means and a cam follower pivotally connected to said adjacent hinge means and operatively connected to said cam means in a manner such that said follower acting on said hinge means rotates said door on vertical axes until it presents a horizontal silhouette smaller than the width of said opening, pulls said door inwardly through said opening to a position offset inwardly from said opening and then pushes said door outwardly into sealing engagement with the periphery of said opening.

6. A mechanism in accordance with claim 15 wherein the door is connected to the hinge means through foldable hand rail means and the mechanism additionally includes motive means for folding said rail means and pivoting said door about an axis parallel to the bottom of the opening.

7. A mechanism in accordance with claim 5 wherein collapsible step means are pivotally mounted on the interior of said door and connected to said hand rail to fold therewith.

8. A mechanism in accordance with claim 5 wherein the hinge means include two links pivotally connected to one another and the cam follower acts on that link immediately adjacent the door.

9. A mechanism in accordance with claim 8 wherein the follower is slideably mounted on a first of the links and is connected to the second of said links through a pivot bar having one end attached to said first link and the other end connected to said second link in a manner to maintain said pivot bar and said second link parallel to one another.

10. A mechanism in accordance with claim 5 wherein the cam track curves gradually inwardly toward the center of the aircraft and in a direction away from the opening, thence follows a substantially straight line toward the center of the aircraft and in away from the opening, thence follows a curvalinear path first generally parallel to the wall of said structure and then generally perpendicular to said wall and toward the center of the aircraft and, finally, describes a curved path inwardly and back toward the edge of said opening; and a branch track begins at approximately the end of the first-mentioned curve and runs generally parallel to the wall of the structure with a slight inward curvature near its end.

11. A mechanism in accordance with claim 5 wherein the cam track turns the door with respect to the structure in a manner such that said door passes through the opening as follows: first one corner adjacent the side of the door connected to the cam, thereafter the other corner on the same side as the first-mentioned corner, then that corner on the opposite side and the same end as the first-mentioned corner, and finally, that corner on the opposite side and the same end as the second-mentioned corner.

12. A mechanism in accordance with claim 5 wherein the end of the door opposite that acted upon by the biasing means carries pivot means adapted to pivot the opposite end of said door through a vertical arcuate path.

13. In an aircraft wall structure having an opening therein and a door larger in both its vertical and horizontal dimensions than said opening and adapted to seal against complimentary edges of said opening from the interior of the aircraft, the combination therewith of a mechanism for opening and closing said door comprising,
(a) hinge means attached to either side of said door and to stationary supports on the interior of said wall adjacent the edges of said opening,
(b) door tilting means pivotally connecting said hinge means and said door and normally holding said door at an angle with respect to said opening such that said door presents a smaller vertical silhouette than the vertical height of said opening and adapted to permit said door to rotate about horizontal axes and assume a position with the sides of said door parallel to the sides of said opening, and (c) cam means including a cam track mounted in the interior of said aircraft adjacent one of said hinge means and a cam follower pivotally connected to said adjacent hinge means and operatively connected to said cam means in a manner such that said follower acting on said hinge means rotates said door on generally vertical axes until it presents a horizontal silhouette smaller than the width of said opening, pulls said door inwardly through said opening to a position offset inwardly from said opening and then pushes said door outwardly into sealing engagement with the periphery of said opening.

14. A mechanism in accordance with claim 13 wherein the interior of the door carries stair means.

15. A mechanism in accordance with claim 14 wherein the stair means are foldable.

References Cited by the Examiner
UNITED STATES PATENTS

| | | |
|---|---|---|
| 2,453,937 | 10/48 | Ray. |
| 2,558,975 | 7/51 | Moreno _____ 182—78 X |
| 2,751,636 | 6/56 | Heinemann _____ 20—16 |
| 2,763,900 | 9/56 | McAfee _____ 20—16 |
| 3,085,297 | 4/63 | Linderfelt _____ 20—16 |
| 3,113,353 | 12/63 | Tucknott _____ 20—16 |

HARRISON R. MOSELEY, *Primary Examiner.*